3,167,402
PROCESSING OF ORES
Gilbert J. Samuelson, Webster Groves, and Albert D. Franse, Crestwood, Mo., assignors to Petrolite Corporation, Wilmington, Del., a corporation of Delaware
Filed Jan. 4, 1960, Ser. No. 104
6 Claims. (Cl. 23—309)

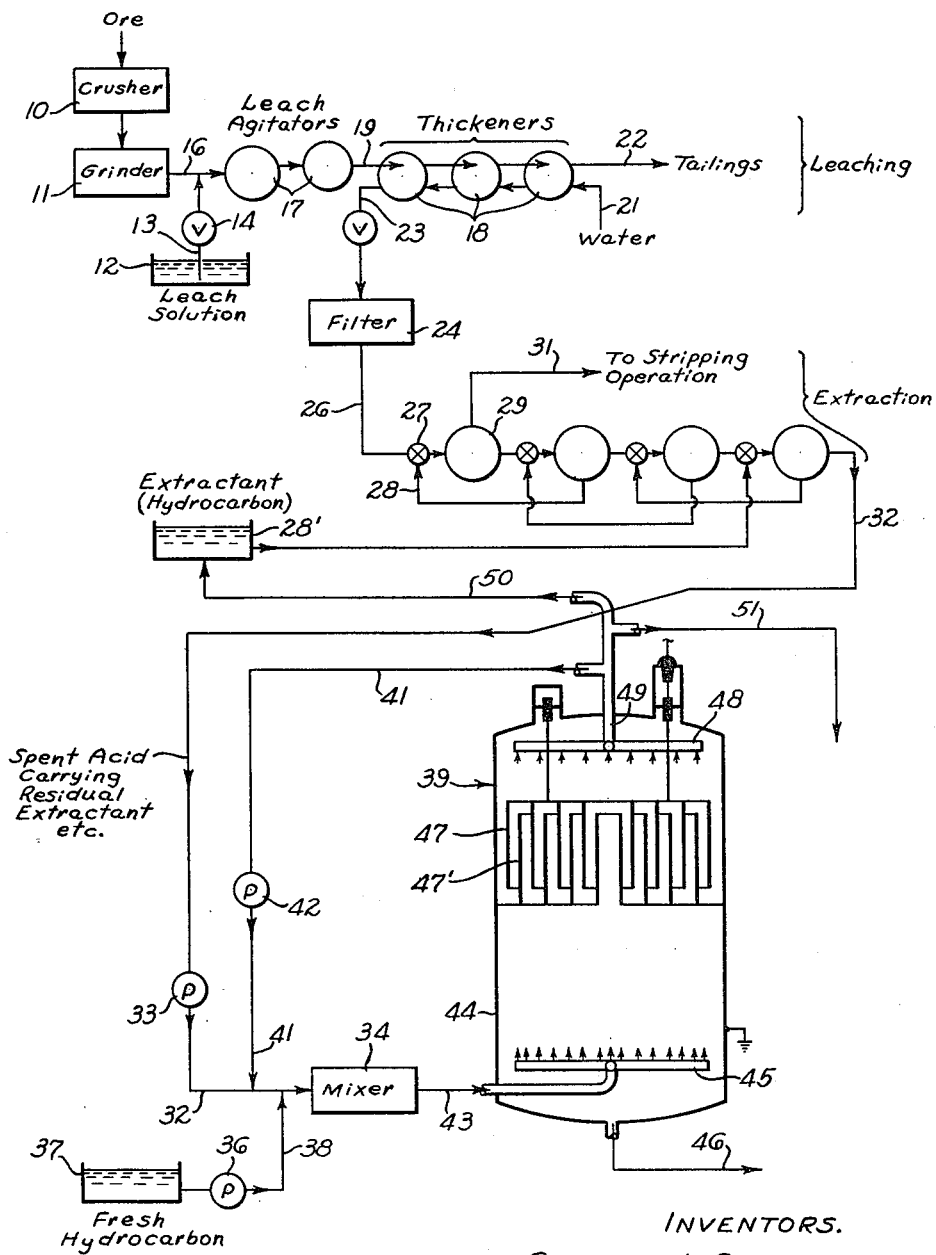

This invention relates to the purification and recovery of metals, especially from ores, and in particular relates to improvements in the application of liquid-liquid solvent extraction methods to such purification and recovery operations.

Liquid-liquid extraction procedures have become important in the processing of uranium ores, waste solutions, scrap metals and by-product solutions produced in various mineral and metallurgical processes, such as phosphate processes, for example. Uranium ores usually contain several tenths of a percent, or less, of $U_3O_8$ and are generally processed by hydrometallurgical techniques. The uranium content of the ore is solubilized by use of sulfuric acid or sodium carbonate leach liquors which also dissolve large amounts of impurities such as iron, aluminum and vanadium. It therefore becomes necessary to separate the desired uranium from the dissolved impurities. Selective adsorption of uranium on anion exchange resins or selective liquid-liquid solvent extraction methods are available for this purpose. Although there are similarities between these liquid-solid and liquid-liquid methods, the liquid-liquid solvent extraction methods possess some fundamental advantages and are growing in importance.

The selective solvent employed to extract uranium values from the aqueous leach liquors is immiscible with the liquors and consists of several percent of an extractant such as a suitable amine or alkyl phosphate dissolved in an oil or hydrocarbon solvent. Kerosene generally is used for economic reasons. Economic considerations also are important in the choice of the extractant because losses of the extractant in the discarded extracted leach liquors and by evaporation and leakage from the solvent extraction system are a major item in the cost of operating a solvent extraction plant.

In extracting the uranium values from the leach liquors the leach liquors and the selective solvent are brought into contact with each other so that the extractant of the solvent can react with the uranyl ion in the liquors to form a product which is relatively more soluble in the organic solvent phase than in the aqueous leach liquor phase. The two phases then are separated and the uranium product is separated and recovered from the organic phase by the use of a sodium carbonate or hydrochloric acid stripping operation. The organic solvent, which also is recovered in a stripping operation, is recycled to the selective solvent extraction system for repeated use.

Various methods of contacting and separating the leach liquors and the selective solvent can be employed, but a four-stage countercurrent system employing feed ratios of about 5:1 of aqueous phase to organic phase have been found to extract about 99 percent of the uranium values present in the feed liquors. Each stage of the system in practice consists of a mixing device and a settling chamber. In the mixing device the two immiscible phases are intimately contacted so that the uranium is transferred from the water phase to the organic phase. To minimize emulsification of the two phases, the mixing conditions are controlled so that the organic phase is the continuous phase and the water phase is dispersed as droplets in the organic phase in the mixing device. This condition is maintained, even though the water phase feed rate is several times that of the organic phase, by recirculating most of the contacted organic solvent recovered from the settling chamber back to the mixing device.

From the mixing device of each stage, the dispersion of water phase in the organic phase is transferred to a settling chamber of the corresponding stage. Gravity separation of the two phases takes place in the settler. The water phase forms a bottom layer when a hydrocarbon fraction such as kerosene is used and the organic phase forms a top layer. An emulsion or coalescence zone usually forms between the top and bottom layers. In this middle zone entrained particles of the phases coalesce to form larger particles which, because of their density, flow toward the top or bottom layer to join the bulk of the organic or water phase, respectively. As pointed out above, a portion of the separated organic phase is recirculated back to the mixer from the settler in each stage to maintain the organic phase as the continuous phase in the mixer. The remainder of the organic phase is transferred to the second stage in the four-stage system to be mixed with aqueous phase being transferred from the third stage, etc., until the overflow organic phase is discharged from the fourth stage. The organic phase thus discharged is stripped of its uranium values, as pointed out above, and the recovered organic solvent is recirculated to the organic solvent inlet point of the solvent extraction system.

The aqueous phase passes through the four stages countercurrently to the organic phase, i.e., it enters the system at the fourth stage and leaves at the first stage. The aqueous phase discharged from the extraction system contains substantially all of the impurities such as iron, aluminum and vanadium leached from the ore, the spent sulfuric acid or sodium carbonate leaching agent, small amounts of the amine or phosphate extractant and kerosene picked up from the organic solvent, and traces of uranium. The loss of extractant in the discharged aqueous phase represents an appreciable cost item because of the relatively high cost of the better, more selective extractant materials discovered to date. The loss of uranium also is undesirable because, although small in amount, its great value makes it significant from a monetary standpoint.

However, the problem of recovering the extractant from the discharged aqueous phase before it is discarded is a very difficult one. The volume of the discharged aqueous phase is relatively large and the concentration of extractant therein is very small. The same is true with regard to the low concentrations of uranium contained in the discharged aqueous phase.

Accordingly, it is an object of this invention to provide an efficient method for recovering the extractant from the discharged or spent aqueous phase before it is discarded.

Another object of the invention is to recover the uranium contained in the spent aqueous phase before it is discarded.

Additional objects will become apparent from the following description which is given primarily for purposes of illustration and not limitation.

A specific embodiment of the invention will be described with reference to the accompanying drawing, which shows diagrammatically a partial flow sheet of an ore processing system. A suitable ore is fed to a crusher 10 and reduced to a particle size of a few eighths of an inch. The crushed ore is fed to a grinder 11 which reduces the crushed ore to through about 20 mesh. Leach liquor from a supply vessel 12 is supplied through a line 13 and valve 14 at a controlled rate and mixed with the ground ore being fed in line 16. The resulting mixture of ground ore and leach liquor is fed to leach agitators 17. In the agitators 17, the pulp and liquor are retained at a desired temperature, controlled by immersion heaters, for a desired time. Additional acid is added if desired to bring about a complete leaching of the ore.

From the leach agitators 17 the resulting slurry is transferred to thickeners 18 through line 19. The thickeners 18 operate countercurrently. Water is introduced at 21 into the end thickener from which tailings are discharged through line 22 for discarding. The leach liquors are discharged from the first thickener 18 through valved line 23 to a filter 24. In passing through filter 24, the leach liquors are clarified to produce clear, pregnant filtrate solution as feed for the solvent extraction circuit. This aqueous feed is supplied through line 26 to a mixer 27 wherein it is mixed with an organic solvent extract supplied through line 28. This selective solvent extract was, of course, produced from fresh organic solvent from tank 28' in its passage through the other three stages of the four-stage countercurrent solvent extraction system shown. The mixed aqueous and organic phases are charged to settler 29 to permit the organic and aqueous phases to separate and form a top organic and a bottom aqueous layer, respectively, as pointed out hereinabove. As described above, a portion of the separated organic phase can be recycled back to the mixer 27 from the settler 29 to maintain the organic phase as the continuous phase and the aqueous phase as the disperse phase in the mixer 27 to avoid or minimize emulsification troubles. The flow lines for this recirculation in the four stages of the extraction system are omitted from the flow sheet to avoid unduly complicating the same.

The unrecirculated portion of the settled layer of organic solvent extract, rich in uranium values, is withdrawn from the solvent extraction system through line 31 and is sent to a stripping section (not shown) for stripping the uranium values from the organic solvent extract. The aqueous raffinate phase is withdrawn from the solvent extraction system through line 32. As pointed out hereinabove, this aqueous raffinate solution contains low concentrations of the extractant, such as an organic amine or phosphate, uranium and hydrocarbon, such as a kerosene fraction, and high concentrations of spent acid or carbonate leaching agent as well as iron, aluminum, vanadium, etc., salts. The extractant and uranium concentrations, although low, represent significant monetary values. These values are recovered, in accordance with the present invention by feeding the aqueous raffinate solution through line 32, with the aid of a pump 33, if desired, into a mixer 34.

The mixer may be a mixing valve, centrifugal pump, a mixing tank of low volume provided with a paddle, or any other suitable mixer. Fresh hydrocarbon solvent, i.e., without any added extractant, such as a raw or virgin kerosene fraction, also is fed to the mixer 34. As indicated in the flow sheet, the kerosene is transferred by pump 36 from container 37 through line 38 into mixer 34 or into line 32 leading to mixer 34. In order to keep the ratio of organic phase to aqueous phase at, or above, the value needed to maintain the organic phase as the continuous phase and the aqueous phase as the disperse phase, a portion of the organic phase overflowing from the electric treater 39 is recirculated to the mixer 34 through line 41 and pump 42. The rate of feeding raffinate phase through line 32 into mixer 34 is controlled relative to the rates of feeding organic liquids through lines 38 and 41, respectively, to achieve this desired phase relationship.

An extraction takes place in the mixed organic and aqueous phases wherein substantially all of the extractant remaining in the aqueous raffinate phase diffuses from the dispersed droplets of aqueous phase into the organic phase because the extractant is relatively more soluble in the kerosene phase than in the water phase. In the flow sheet only one recovery stage is shown but two or more recovery stages can be used in countercurrent relationship, if desired. If the extractant is very soluble in the kerosene phase and only slightly soluble in the water phase, a satisfactory degree of recovery can be obtained by the use of only one recovery stage. However, if the solubility of the extractant in the water phase approaches the order of magnitude of that in the kerosene phase, two or more countercurrently arranged recovery stages will be advisable to recover substantially all of the extractant from the raffinate phase.

Similarly, a substantial portion of the uranium values in the raffinate phase will be extracted therefrom by the organic phase as the extractant passes from the raffinate phase to the organic phase.

The dispersion of aqueous phase in organic phase produced in mixer 34 is fed through line 43 into the lower portion of tank 44 of electric treater 39. Line 43 is connected to a manifold 45, which can be in the form of a pair of conduits forming a cross in a horizontal plane and provided with apertures along their lengths. The dispersion of the water phase in the kerosene phase passes through the apertures and flows upwardly, as indicated by the arrows, in the liquid filled tank 44. The direction of flow of the dispersion of droplets in the organic phase is upwardly because the bulk density of the continuous organic phase is lower than the surrounding continuous water phase. Some gravity separation of water phase from the organic phase generally takes place in the lower portion of the tank after discharge from the manifold 45. Such separated water phase moves downwardly in tank 44 to become part of the aqueous raffinate phase which is drawn off the bottom of tank 44 through line 46 at a controlled rate. This raffinate phase from line 46 is treated in a second stage, if such is used, or is discarded through a surge tank (not shown) to a tailings pond (not shown).

The remaining continuous organic or kerosene phase containing dispersed droplets of aqueous raffinate phase moves upwardly in tank 44 toward a middle zone thereof into an induced electric field between electrodes 47 and 47'. The electric field is induced by any suitable high voltage source, preferably unidirectional, the field having a gradient of from 5 to 15 kv./inch between the electrodes.

While passing through the electric field, the droplets of dispersed water phase in the continuous kerosene phase have electrostatic charges induced upon them. These induced electrostatic charges cause the droplets to attract each other and coalesce. Upon coalescing, the size of the droplets of disperse water phase increases until these droplets become large enough to move downwardly by gravity through the organic phase and enter the water phase in the lower portion of tank 44.

When the organic phase moves out of the induced electric field it is substantially completely free of water phase. The treated organic phase is drawn out of tank 44 through a manifold 48, which is similar to manifold 45 described above. Some of the withdrawn treated organic phase can be drawn from line 49 into recycle line 41 as previously described. Another portion can be returned to the tank 28' through a line 50. A product portion can be withdrawn from the system through line 51 if more than one treating stage is not used. The portions obtained through lines 50 or 51 can be used as make-up material to replace the organic selective solvent normally lost from the extraction system. A saving in extractant is achieved to the extent that extractant has been recovered by the fresh organic solvent in the recovery system described immediately above. Similarly, the uranium values recovered from the raffinate phase in this recovery system are returned to the selective solvent extraction system to be eventually stripped and recovered.

It will be understood that although the invention has been described above primarily as applied to the processing of uranium ores, it is not limited to such applications, but is applicable to other similar processing such as scrap metals, waste liquors, by-product streams such as those produced in phosphate processing, for example. Also, the invention is not limited to uranium processing, but is applicable to the processing of metals such as thorium, molybdenum, manganese, and, in fact any metal. Acid, neutral and alkaline extractants have been developed. By choosing the proper combinations of extractant, solvent and solution conditions any metal can be separated from any other metal, rare earths can be separated from each other, and radiochemical and isotope separations can be made. The invention described hereinabove is generally applicable in all these cases for recovering extractant materials and metals from the aqueous raffinate phase in a manner similar to that described above.

We claim as our invention:

1. A method of purifying metal-bearing materials by solvent extraction, comprising: mixing an aqueous solution containing metal values and impurities with an organic solvent comprising a first-added hydrocarbon containing therein an extractant capable of selectively extracting the metal values from the aqueous solution, thereby producing an organic extract phase and an aqueous raffinate phase; separating said phases by difference in specific gravity to produce a separated organic phase and a separated aqueous phase containing small amounts of residual metal values, residual first-added hydrocarbon and residual extractant as residual impurities; recovering metal values from the separated organic extract phase; mixing with the separated aqueous phase while containing said small amounts of residual metal values, first-added hydrocarbon and extractant as residual impurities a sufficient amount of a second-added hydrocarbon having selective solubility toward said residual impurities to form a hydrocarbon-continuous mixture in which the hydrocarbon phase contains substantially all said residual extractant and a substantial portion of said residual metal values and residual first-added hydrocarbon present as impurities in said separated aqueous phase, said hydrocarbon-continuous mixture containing a dispersed aqueous phase comprising droplets of said separated aqueous phase correspondingly depleted in content of said residual extractant, metal values and first-added hydrocarbon; establishing between spaced electrodes a high-voltage electrostatic field of sufficient intensity to coalesce the dispersed droplets of such dispersed aqueous phase into aqueous masses of sufficient size to gravitate from said hydrocarbon phase; bridging across such electrodes such mixture while still hydrocarbon-continuous to coalesce such dispersed aqueous phase droplets into such aqueous masses; and separating such aqueous masses to produce two separated bodies comprising, first, a separated hydrocarbon body now containing substantially all said residual extractant and a substantial portion of said residual metal values and, second, a separated aqueous body comprising the material of said aqueous masses and correspondingly depleted in the residual extractant and residual metal values now in said separated hydrocarbon body.

2. A method as defined in claim 1 in which the second-added hydrocarbon mixed with said separated aqueous phase is composed in part of a fresh hydrocarbon substantially free of said extractant and composed in part of a portion of the electrically-treated and separated hydrocarbon body.

3. A method as defined in claim 2 in which a second portion of said electrically-treated and separated hydrocarbon body thereof is returned to said first-added hydrocarbon used in the first-mentioned mixing step.

4. A method as defined in claim 3 in which a third portion of said electrically-treated and separated hydrocarbon body is withdrawn as a product portion.

5. A method as defined in claim 1 including the step of gravitationally separating from said hydrocarbon-continuous mixture a portion of the dispersed aqueous phase thereof and then subjecting the remaining hydrocarbon-continuous mixture to the action of said high-voltage electrostatic electric field.

6. A method as defined in claim 1 in which said first-added hydrocarbon is kerosene, said second-added hydrocarbon being a fresh kerosene free of said extractant, said electrically-treated and separated hydrocarbon body being a kerosene body, and in which a portion of said kerosene body is returned to and mixed with said separated aqueous phase along with the fresh kerosene before electric treatment of said mixture in said high-voltage electric field.

References Cited in the file of this patent
UNITED STATES PATENTS

| | | |
|---|---|---|
| 2,227,833 | Hixson et al. | Jan. 7, 1941 |
| 2,813,064 | Clark | Nov. 12, 1957 |
| 2,855,357 | Stenzel | Oct. 7, 1958 |

OTHER REFERENCES

I.S.C.–694, Application of Liq-Liq Extraction to the Separation of Tantalum From Niobium, July 1954 (pp. 5 and 6).

MCW–1437, De-Entrainment of Organic Extract by Electrostatic Precipitation, issued November 6, 1959, 11 pages.